United States Patent [19]

Komatsu et al.

[11] Patent Number: 4,695,065
[45] Date of Patent: Sep. 22, 1987

[54] KEYLESS CHUCK FOR ROTARY TOOL

[75] Inventors: Teruaki Komatsu, Hikone; Kiyoshi Kobayashi, Nagahama; Kunihiko Tatsu; Shoichi Shibata, both of Hikone, all of Japan

[73] Assignee: Matsushita Electric Works, Ltd., Japan

[21] Appl. No.: 946,067

[22] Filed: Dec. 24, 1986

[30] Foreign Application Priority Data

Jan. 21, 1986 [JP] Japan .................................. 61-10834

[51] Int. Cl.⁴ ............................................. B23B 31/12
[52] U.S. Cl. ..................................... 279/60; 279/1 K; 279/64
[58] Field of Search ............... 279/1 K, 60, 61, 62, 279/63, 64, 65; 408/239 R, 240, 241 R; 81/16

[56] References Cited

U.S. PATENT DOCUMENTS

| | | | |
|---|---|---|---|
| 2,042,197 | 5/1936 | Stoner | 279/61 |
| 3,970,323 | 7/1976 | Schnizler, Jr. | 279/64 |
| 4,230,327 | 10/1980 | Rohm | 279/61 |
| 4,275,893 | 6/1981 | Bilanceri | 279/64 |
| 4,302,021 | 11/1981 | Rohm | 279/60 |
| 4,498,682 | 2/1985 | Glore | 279/1 K |
| 4,527,809 | 7/1985 | Umbert | 279/64 |

Primary Examiner—Gil Weidenfeld
Assistant Examiner—Glenn L. Webb
Attorney, Agent, or Firm—Stevens, Davis, Miller & Mosher

[57] ABSTRACT

A keyless chuck for a rotary tool comprises a chuck body which is adapted to be coupled at its one end to a drive spindle of a drive source and coupled at the other end to a tool bit for establishing a driving connection from the drive source to the tool bit. Relatively rotatable to the chuck body is a handle ring which is operatively connected to a set of gripping jaws for tightening the gripping jaws on the tool bit upon being rotated in one direction and loosening the same upon being rotated in the opposite direction. The handle ring is disposed on the chuck body in such a manner as to coincide the rotating direction of the handle ring for tightening the gripping jaws with the reverse rotating direction of the chuck body for removing the tool bit from a workpiece. A clutch interconnects the handle ring and the chuck body in order to rotatively fix the handle ring to the chuck body when the latter is driven to rotate in the reverse direction of removing the tool bit, causing the handle ring to positively rotate in the direction of tightening the gripping jaws and thus preventing it from counter-rotating in the direction of loosening the tool bit when there develops an interaction between the rotating chuck body and the handle ring relatively rotatable thereto. Associated with the clutch is a control mechanism which functionally moves the clutch between an active position where it is activated for the clutch connection and an inactive where it releases the handle ring from the chuck body to permit the relative rotation of the handle ring with respect to the chuck body for enabling the hand tightening and loosening of the gripping jaws.

9 Claims, 16 Drawing Figures

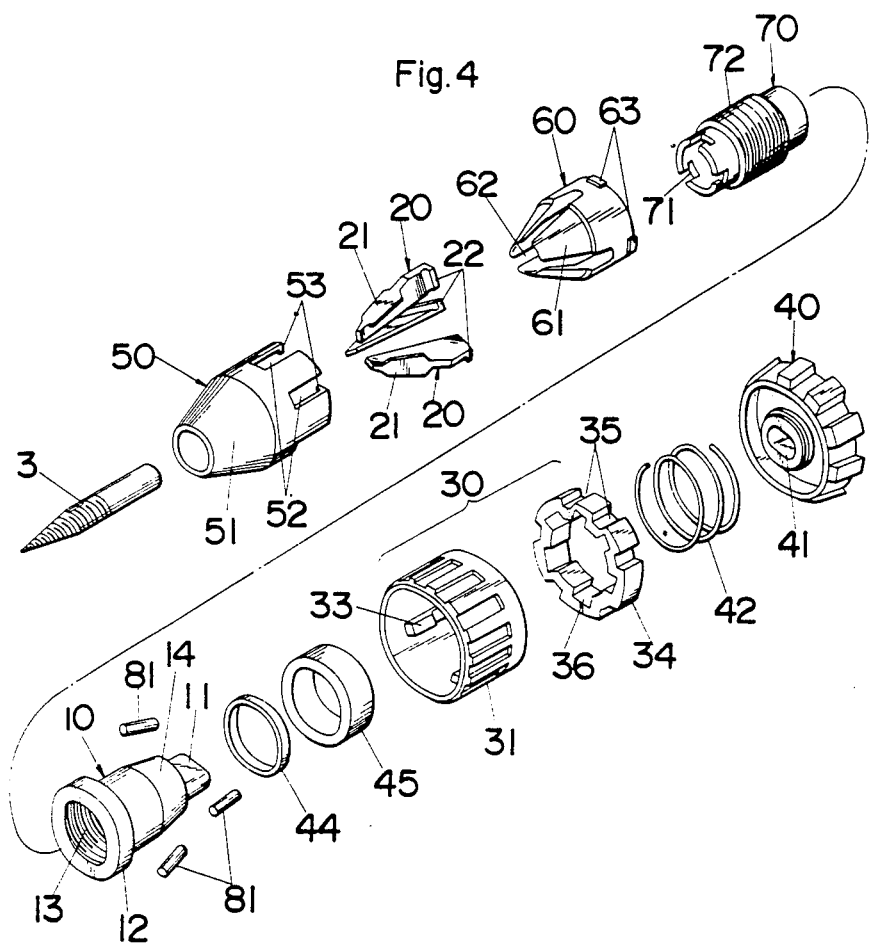
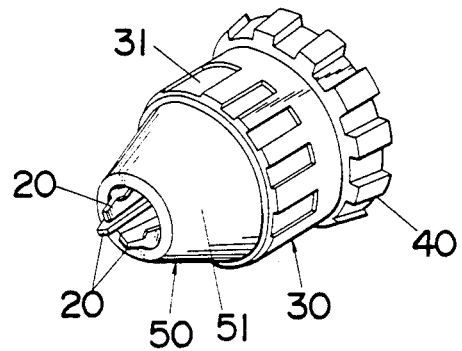

KEYLESS CHUCK FOR ROTARY TOOL

BACKGROUND OF THE INVENTION

1. Field of the Invention

The present invention is directed to a keyless chuck adapted to releasably hold a tool bit such as a drill bit of a power drill or the like rotary power tools, and more particularly to a chuck for rotary power tools capable of reversing the tool bit.

2. Description of the Prior Art

Keyless chucks are known in the art in which a set of gripping jaws are tightened on a tool bit by manipulating a handle ring to rotate independently of a driving connection from a drive source to the tool bit. Such handle ring is generally located around a chuck body which carries the gripping jaws and is adapted to be coupled to a drive spindle of the drive source for establishing the driving connection. The handle ring is rotatable relative to the chuck body and is operatively connected to the gripping jaws in such a way as to tighten and loosen the same on the tool bit upon being selectively rotated in relation to the chuck body. This provision of disposing the handle ring around the chuck body is very likely to be the cause of generating a counter rotating action between the handle ring and the rotating chuck body such that the handle ring is forced to be rotated in the opposite direction to that of the chuck body when the latter is driven to rotate for performing the work with the tool bit. This counter rotation of the handle ring due to the rotation of the chuck body certainly results in the unintended loosening of the gripping jaws, which is accompanied by the rotation of the chuck body in one of the directions of advancing and removing the tool bit into and from a workpiece. In other words, even the handle ring is arranged to counter-rotate in the direction of tightening the tool bit in response to the chuck body being driven to rotate for advancing the tool bit into the workpiece in order to prevent the undesired loosening of the gripping jaws due to such counter rotating action during this tool driving operation, which is usual with the prior keyless chucks, the above undesired loosening is inevitable when the chuck body is rotated in the opposite direction of removing the tool bit from the workpiece. This poses a serious problem particularly when the chuck is utilized in a power tool such as a power drill and a screwdriver capable of reversing the tool bit for removing the tool bit by the use of its power since the resistance or reaction torque applied to the tool bit from the workpiece during this operation is additive to cause the handle ring to counter-rotate in the direction of loosening the gripping jaws, eventually failing to continue the operation of removing the tool bit from the workpiece.

SUMMARY OF THE INVENTION

The present invention eliminates the above problem by adopting a unique clutch connection effective for preventing the loosening of the gripping jaws at the time of driving the tool bit to rotate in either direction. A keyless chuck for a rotary tool in accordance with the present invention comprises a chuck body having a longitudinal axis and adapted to be connected to a drive spindle of a drive source for rotation about the axis and a set of gripping jaws drivingly connected to the chuck body and releasably holding a tool bit to be driven to rotate. Disposed on the chuck body is a handle ring which is relatively rotatable thereto and is operatively connected to the gripping jaws for displacing the same into and out of tool-gripping relation with the tool bit upon selective rotation thereof. The handle ring is arranged to tighten the gripping jaws on the tool bit when rotated in the same direction as that of the chuck being reversely rotated for removing the tool bit from a workpiece. A clutch means is provided to rotatively fix the handle ring to the chuck body when the latter is driven to rotate in the direction of removing the tool bit from the workpiece such that the handle ring is forced to rotate together therewith for preventing the gripping jaws from loosening. This means that the handle ring is prevented from being rotated in the direction of loosening the gripping jaws when the chuck body is driven to rotate in the reverse direction of removing the tool bit, which event would otherwise occur due to the interaction possibly generated between the handle ring and the chuck body and acting to counter-rotate the handle ring in the opposite direction to that of the chuck body. Associated with the clutch means is a control means for selectively activating and deactivating the clutch means. That is, the clutch means is functionally movable by the operation of the control means between an active position where it is capable of rotatively fixing the handle ring to the chuck body and an inactive position where it releases the handle ring from the chuck body for permitting the handle ring to be freely rotatable in relation to the chuck body. By disengaging the clutch connection between the handle ring and the clutch body with this control means, the handle ring can be relatively rotated with respect to the chuck body for hand tightening and loosening of the tool bit.

Accordingly, it is a primary object of the present invention to provide a keyless chuck for a rotary tool which prevents the loosening of the gripping jaws during the reverse drive operation of removing the tool bit from the workpiece, yet assuring easy hand operation of tightening and loosening the gripping jaw for replacement of the tool bit, and which is most suitable for a power tool capable of rotating the tool bit in the reverse direction.

In a preferred embodiment, the handle ring is formed in its interior surface with a plurality of circumferentially spaced grooves about the rotation axis of the chuck body each for receiving therein a roller which is in rolling contact with the exterior of the chuck body. Each of the grooves defines on its bottom a wedge surface which is sloped radially inwardly in the circumferential direction about the axis of the chuck body so as to form within the groove a first portion of reduced depth adjacent to one of the circumferential ends of the groove and a second portion of increased depth portion adjacent to the other circumferential end thereof. It is this wedge surface that is cooperative with the roller trapped in the groove to constitute the clutch means which is characterized to effect a one-way clutch connection between the handle ring and the chuck body. This one-way clutch responds to the rotation of the chuck body in the reverse direction of removing the tool bit for rotatively fixing the handle ring to the chuck body as the roller is dragged by the rotating chuck body into engagement with the wedge surface of the first portion, thus preventing of the relative rotation therebetween in response to the chuck body being driven to rotate in the reverse direction of removing the tool bit from the workpiece. This direction responsive one-way clutch is incorporated based upon the recognition that the handle ring will counter-rotate in the direction of tightening the gripping jaws in response to the chuck body rotating in the forward direction of advancing the tool bit and is therefore no longer necessary to be rotatively fixed to the chuck body when the latter rotates in the forward direction. The handle ring is axially movable between an active position where the one-way clutch is activated and an inactive position where it is deactivated to disengage the handle ring from the chuck body and permit the handle ring to be freely rotatable with respect to the chuck body ready for hand operation of tightening the gripping jaws.

This control action for selectively activating and deactivating the clutch means is effected by better utilization of the common rollers of the one-way clutch. Each roller has its axis of rotation inclined with respect to the rotation axis of the chuck body as being kept in rolling contact with the correspondingly inclined exterior surface of the chuck body. Formed on the bottom of each groove is an axially extending tapered surface which is inclined with respect to the rotation axis of the chuck body but in parallel relation to the rotation axis of the roller so as to be engageable along the substantially the entire length thereof with the roller. With this arrangement, the roller is cooperative with the tapered surface to constitute the control means which acts to bring the tapered surface into engageable relation with the roller for enabling the above clutch connection in response to the axial movement of the handle ring in one direction. When the handle ring is axially moved in the opposite direction, the tapered surface is away from engagement with the roller so as to permit the relative rotation of the handle ring about the chuck body for hand tightening of the gripping jaws. The handle ring is preferably biased to the active position of activating the clutch connection.

It is therefore another object of the present invention to provide a keyless chuck for a rotary tool in which the handle ring is connected to the chuck body through the one-way clutch of the roller and wedge combination, and in which the rollers are effectively utilized to constitute the control mechanism for selectively activating and deactivating the clutch.

Alternative forms of the one-way clutch are also disclosed in the prevent invention. In one form, a wedge element is formed on the side of a clutch sleeve which is relatively rotatable around the chuck body and is interconnected to the handle ring to be rotatable therewith as one rotating unit. The wedge element forms with the exterior of the chuck body like groove with a wedge surface on its bottom which provides the wedge engagement with the roller trapped in the groove for making the like one-way clutch connection between the chuck body and the handle ring through the clutch sleeve. The wedge element is radially movable between an active position in which it is closed to the exterior surface of the chuck body to form therebetween the wedged groove and an inactive position in which it is away from the exterior surface of the chuck body to collapse the wedged groove disabling the wedge engagement between the roller and the wedged groove. A control handle is disposed around the clutch sleeve to be relatively rotatable thereto for controlling the wedge element to move between the active position and the release position upon being selectively rotated about the clutch sleeve.

In another form, the one-way clutch connection is made by utilizing a ratchet pawl engageable with teeth formed on the exterior of the chuck body. The ratchet pawl is formed on the like clutch sleeve rotatably disposed around the chuck body and interconnected to the handle ring to be rotatable therewith. The ratchet pawl when engaged with the teeth on the chuck body serves to rotatively fix the chuck body to the clutch sleeve or the handle ring only when the drive chuck is driven to rotate in the reverse direction of removing the tool bit. The ratchet pawl has such resiliency that it is capable of being slipped off the teeth when the chuck body rotates in the opposite direction, thus providing the one-way clutch connection between the chuck body and the handle ring. Like control handle is provided around the clutch sleeve for controlling the ratchet pawl to move between an active position where it engages the teeth and an inactive position where it is disengaged from the teeth for permitting the clutch sleeve or the handle ring to be freely rotatable on the chuck body.

It is therefore a further object of the present invention to provide a keyless chuck for a rotary tool which presents alternative forms of the one-way clutch connection.

The clutch connection between the chuck body and the handle ring should not be limited to the above clutch of one-way direction type, and may take the form of a bidirectional clutch which acts to rotatably fix the handle ring to the chuck body irrespective of the direction in which the chuck is driven to rotate. The bidirectional clutch is disclosed in a preferred embodiment to comprise a pair of diametrically opposed toothed shoes formed on the side of like clutch sleeve. The toothed shoes are radially movable between an active position in which it is in meshing engagement with the chuck body to rotatively fix the handle ring to the chuck body for preventing relative rotation therebetween and an inactive position in which it is away from the meshing engagement with the teeth to permit the clutch sleeve, or the handle ring to be freely rotatable for manual. The toothed shoes are controlled by like control handle to be movable between the active and inactive positions.

It is therefore a still further object of the present invention to provide a keyless chuck for a rotary tool in which the handle ring and the chuck body are interconnected by the bidirectional clutch of simple construction.

These and still other objects and advantages of the present invention will be more apparent from the following description of the preferred embodiments when taken in conjunction with the accompanying drawings.

BRIEF DESCRIPTION OF THE DRAWINGS

FIG. 3 is a perspective view of the chuck;

FIG. 4 is an exploded perspective view of the chuck;

DETAILED DESCRIPTION OF THE PREFERRED EMBODIMENTS

First embodiment [FIGS. 1 to 6]

Figure 1:
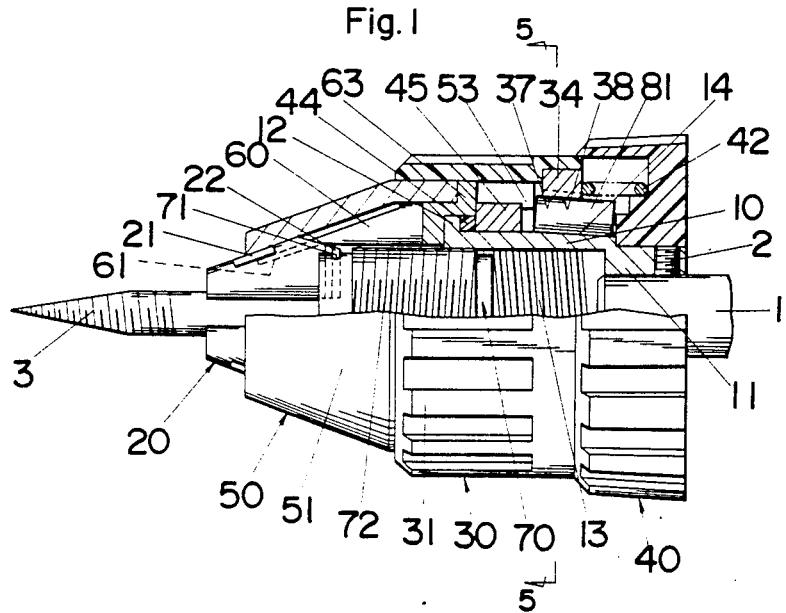
FIG. 1 is a side view, partly in section, of a chuck for a rotary tool with its handle ring shown in an engaged position with a chuck body in accordance with a first embodiment of the present invention.
Figure 2:
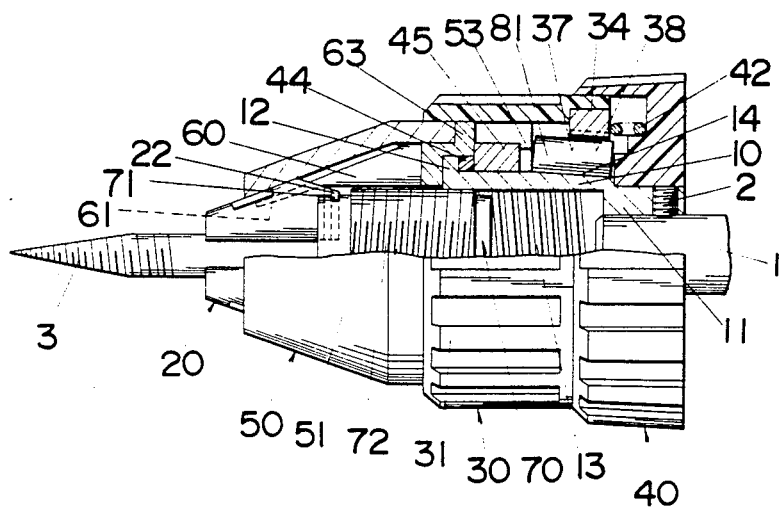
FIG. 2 is a side view similar to FIG. 1, but showing the chuck with the handle ring in a disengaged position from the chuck body.

Referring to FIGS. 1 to 6, there is shown a keyless chuck for a rotary tool in accordance with a first preferred embodiment of the present invention. The chuck is adapted for use in a rotary power tool such as a drill or screwdriver capable of reversing its rotating direction. The chuck comprises a chuck body 10 adapted to be coupled to a drive spindle 1 of the power tool (not shown), a set of gripping jaws 20 for releasably holding a suitable tool bit 3 to be driven by the chuck body 10 to rotate in either direction, and a handle ring 30 for tightening the gripping jaws 20 on the shank of the tool bit 3. The chuck body 10 is in the form of a hollow cylinder having a longitudinal axis about which it is driven to rotate by the drive spindle 1. Extending axially rearwardly of the chuck body is a coupling boss 11 of a reduced diameter into which the drive spindle 1 extends and is secured thereto by means of a screw 2. The coupling boss 11 is of non-circular cross section and is snugly fitted in a correspondingly shaped socket 41 of a grip ring 40 with a knurled surface for rigid connection of the grip ring 40 to the chuck body 10. The handle ring 30 is disposed around the chuck body 10 to be relatively rotatable in a coaxial relation thereto and is operatively connected to the gripping jaws 20 through a nose piece 50, a jaw carrier 60, and a floating collet 70 for tightening and loosening the gripping jaws 20 upon being rotated relative to the chuck body 10.

Figure 5:
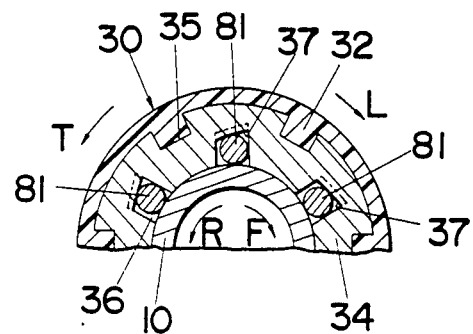
FIG. 5 is a fragmentary sectional view taken along line 5—5 of FIG. 1

The handle ring 30 is of two-piece construction composed of an operator ring 31 and a clutch sleeve 34, the operator ring 31 being made of plastic material with a knurled surface, and the clutch sleeve 34 being made of metallic material providing excellent wear resistance. The clutch sleeve 34 is snugly fitted within the rear end portion of the operator ring 31 with rear projections 32 on the interior of the operator ring 31 engaged with recesses 35 in the exterior of the clutch sleeve 34, as best shown in FIG. 5, for providing an integral construction. The nose piece 50 is formed to have a conical section 51 at its front end and is connected at its rear end to the handle ring 30 with front projections 33 on the interior of the operator ring 31 engaged with notches 52 in the rear end of the nose piece 50 so that it is rotatable together with the handle ring 30. The connection between the handle ring 30 and the nose piece 50 is such that every other one of the notches 52, which are circumferentially spaced about the rotation axis of the chuck body 10, receives therein the front projections 33. The remaining notches 52 receives therein protrusions 63 on the rear end of the jaw carrier 60 for connection between the nose piece 50 and the jaw carrier 60. In this way, the handle ring 30, nose piece 50 and jaw carrier 60 are interconnected to be rotatable together as one rotating unit. The jaw carrier 60 is formed in its front cone 61 with a corresponding number of axially extending slots 62 in which the gripping jaws 20 are slidably received respectively with a pad 21 of each gripping jaw 20 slidably supported on the exterior of the front cone 61. The rear end of each gripping jaw 20 is formed with a L-shaped hook 22 which extends through the interior of the jaw carrier 60 into engagement with each of nicks 71 in the front end of the floating collet 70 for connection of the gripping jaws 20 therewith in axial as well as rotational directions. The floating collet 70 has its external thread 72 engaged with the internal thread 13 of the chuck body 10 in reverse threaded engagement fashion such that when the chuck body 10 is driven to rotate in a forward direction the collet 70 advances in the axial direction as being rotated in the opposite direction to the chuck body 10. Upon this occurrence, the gripping jaws 20 on the rotating jaw carrier 60 are urged against the inner conical surface of the conical section 51 of the nose piece 50 to enhance the gripping engagement thereof with the tool bit 3, assuring to advance the tool bit 3 to a workpiece as firmly gripping the same. The nose piece 50 is axially connected to the chuck body 10 by means of a thrust bearing 44 and a spacer ring 45 which are interposed between an external flange 12 on the front end of the chuck body 10 and an internal flange 53 on the rear end of the nose piece 50. The spacer ring 45 is located between the rear end of the nose piece 50 and the front end of the chuck body 10 to be rotatable in relation thereto, and the thrust bearing 44 made of fluoroethylene resin being held axially between the external flange 12 of the chuck body 10 and the spacer ring 45.

The handle ring 30 thus connected to the gripping jaws 20 is rotatable together with the nose piece 50 and the jaw carrier 60 as one rotating unit in relation to the chuck body 10. When it is intended to tighten the gripping jaws 20 on the tool bit 3, the handle ring 30 is rotated in the counter-clockwise direction as viewed from the rear end of the chuck, or the direction indicated by T in FIG. 5 in order to rotate the gripping jaws 20 and the floating collet 70 in the same direction. Upon this rotation, the collet 70 is caused to advance forward in the axial direction in a telescopic manner as rotating with respect to the chuck body 10, thereby thrusting the gripping jaws 20 against the inner surface of the conical section 51 for displacing radially inwardly the gripping jaws 20 into tool-gripping engagement with the tool bit 3. For loosening the gripping jaws 20, the handle ring 30 is rotated in the opposite direction L. The above grip ring 40 is utilized to hold the chuck body 10 in position while manipulating the handle ring 30 to rotate thereabout, facilitating the hand operation of tightening and loosening the gripping jaws 20.

Figure 6:
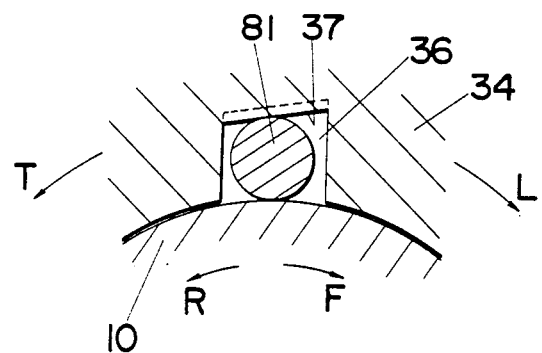
FIG. 6 is an enlarged sectional view of a portion of FIG. 5.
Figure 7:
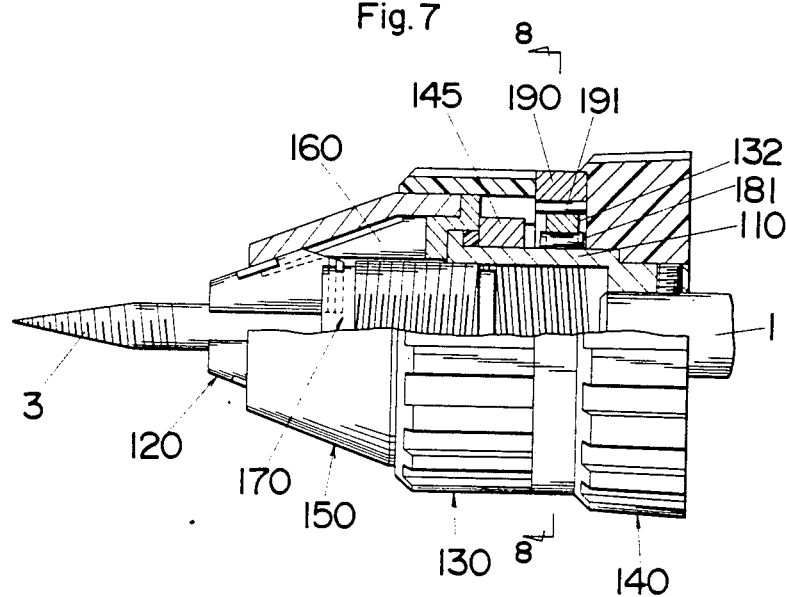
FIG. 7 is a side view, partly in section, of a chuck with its control handle being in a position of activating a clutch sleeve in accordance with a second embodiment of the present invention.
Figure 8:
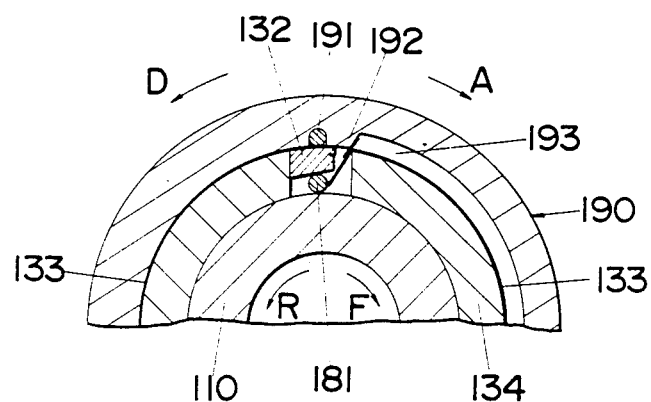
FIG. 8 is a fragmentary sectional view taken along line 8—8 of FIG. 7.
Figure 9:
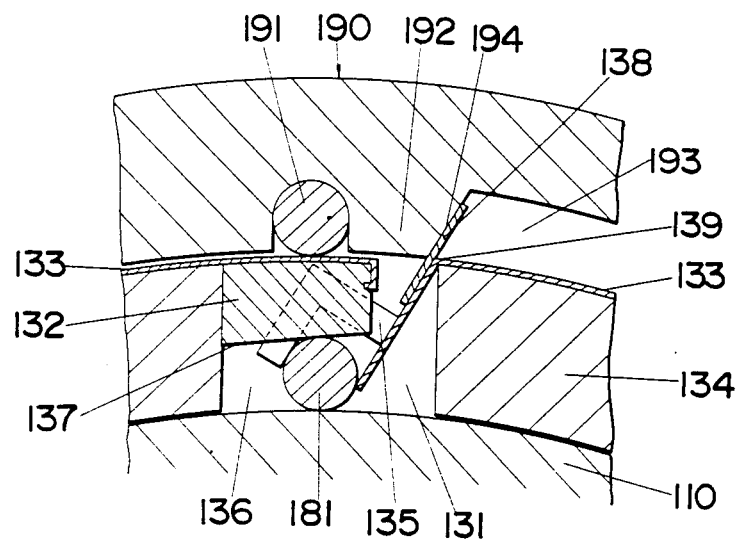
FIG. 9 is an enlarged sectional view of a portion of FIG. 8 illustrating a wedge element in its active position.

A clutch is provided for selectively interconnecting the handle ring 30 and the chuck body 10 in order to prevent the handle ring 30 from being caused to counter-rotate in the direction L of loosening the gripping jaws 20 when the chuck body 10 is driven to rotate in the reverse direction R of removing the tool bit 3 from the workpiece. The clutch comprises a plurality of rollers 81 which are trapped respectively in axially extending grooves 36 formed in the interior of the clutch sleeve 34 of the handle ring 30 in rolling contact with the exterior of the chuck body 10. The grooves 36 are circumferentially spaced about the rotation axis of the chuck body 10 and are each formed on its bottom with a wedge surface 37 which is sloped radially inwardly in the circumferential direction so as to form within the groove 36 a first portion of reduced depth adjacent to one of the circumferential ends of the groove 36 and a second portion of increased depth portion adjacent to the other circumferential end thereof, as best shown in FIGS. 5 and 6. When the chuck body 10 is driven to rotate in the reverse direction R of removing the tool bit 3 from the workpiece, each roller 81 is dragged into the first portion of reduced depth where it comes into wedge engagement with the wedge surface 37 to rotatively fix the handle ring 30 to the chuck body 10, whereby the handle ring 30 is caused to rotate together with the chuck body 10 in the same direction, or the direction T of tightening the gripping jaws 20.

When, on the other hand, the chuck body 10 is driven to rotate in the forward direction F, each roller 81 is dragged into the second portion of increased depth where it is freely rotatable so as to disengage the handle ring 30 from the chuck body 10, allowing the handle ring 30 to counter-rotate in the opposite direction. That is, the above clutch acts to provide a one-way clutch connection capable of interconnecting the handle ring 30 and the chuck body 10 only when the latter is driven to rotate in the reverse direction R. This one-way clutch connection is enough for preventing the unintended loosening of the gripping jaws 20 since the handle ring 30 counter-rotates in the direction T of tightening the gripping jaws 20 when the chuck body 10 is driven to rotate in the forward direction F, as described hereinbefore.

Each of the rollers 81 is trapped in the individual groove 36 with its axis of rotation inclined with respect to the axis of the chuck body 10 and is kept in rolling contact with a correspondingly inclined surface 14 formed on the chuck body 10 forwardly of the coupling boss 11. Each of the grooves 36 of the handle ring 30 extends axially to form on its bottom an axially extending tapered surface 38 which is inclined with respect to the axis of the chuck body 10 but in parallel relation with the rotation axis of the roller 81 so as to be engageable along substantially the entire length thereof with the roller 81. It is to be noted at this time that the handle ring 30 is axially movable between an active position of FIG. 1 in which the tapered surface 38 is kept in engageable relation with the roller 81 for activating the above one-way clutch connection and an inactive position of FIG. 2 in which the tapered surface 38 is kept out of engageable relation with the roller 81 for deactivating the clutch connection. A spring 42 is interposed between the grip ring 40 and the clutch sleeve 34 of the handle ring 30 for biasing the latter into the active position. When it is desired to loosen the gripping jaws 20 for removing the tool bit 3, the handle ring 30 is moved axially rearwardly to the inactive position to be disengaged from the chuck body 10 and is then manipulated to rotate in the direction L. Upon this rotation, the floating collet 70 linked to the handle ring 30 is rotated with respect to the chuck body 10 for retarding the gripping jaws 20, whereby the gripping jaws 20 are displaced axially rearwardly and radially outwardly to be out of tool-gripping engagement with the tool bit 3. It should be noted at this point that the above one-way clutch connection makes it possible to hand tighten the gripping jaws 20 simply by rotating the handle ring 30 into its active position or without the need to axially move the handle ring 30 into the inactive position against the bias of the spring 42, since the clutch allows the handle ring 30 to be freely rotatable with respect to the chuck body 10 in the direction T of tightening the gripping jaws 20.

Second embodiment [FIGS. 7 to 10]

In accordance with a second embodiment of the present invention, there is shown a chuck which is identical in construction to the first embodiment except for a clutch mechanism and a control mechanism. A clutch sleeve 134 is disposed on a chuck body 110 to be rotatable in relation thereto and is interconnected to a handle ring 130 to be rotatable therewith as one rotating unit. The chuck body 110 is drivingly connected to a tool bit 3 through a floating collet 170 and gripping jaws 120 in the same manner as in the first embodiment. The interconnection between the clutch sleeve 134 and the handle ring 130 may be made by suitably engaging the clutch sleeve 134 with one of the members constituting the one rotating unit, i.e., the handle ring 130, nose piece 150, jaw carrier 160, and a spacer ring 145. The clutch sleeve 134 is in the form of a split ring with an opening 131 in which are received a wedge element 132 and a roller 181. The wedge element 132 is supported to the clutch sleeve 134 by means of a leaf spring 133 to be radially movable between a closed position of FIG. 9 where it is closed to the exterior surface of the chuck body 110 to form therebetween a groove 136 and an open position of FIG. 10 in which it is away from the exterior surface of the chuck body 110 to collapse the groove 136. The surface of the wedge element 132 opposed to the chuck body 110 is shaped to define a wedge surface 137 which is sloped radially inwardly in the circumferential direction when the wedge element 132 is in the closed position. The leaf spring 133 extends around the clutch sleeve 134 and is secured thereto except for the opposite free ends, one end of which carries the wedge element 132 for biasing it radially outwardly by the resiliency of the leaf spring 133 and the other end of which carries a retainer 135 for the roller 181 for likewise biasing the roller 181 radially outwardly. It is in this closed position that the wedge surface 137 is cooperative with the roller 181 to form a clutch providing a one-way clutch connection between the chuck body 110 and the clutch sleeve 134, in the same manner as in the first embodiment. Thus, when the chuck body 110 is driven to rotate in the reverse direction R of removing the tool bit 3 from the workpiece, the roller 181 comes into wedge engagement with the wedge element 132 so as to rotatively fix the chuck body 110 to the clutch sleeve 134 and the handle ring 130 interconnected thereto, preventing the handle ring 130 from rotating in the direction of loosening the gripping jaws 120.

Figure 10:
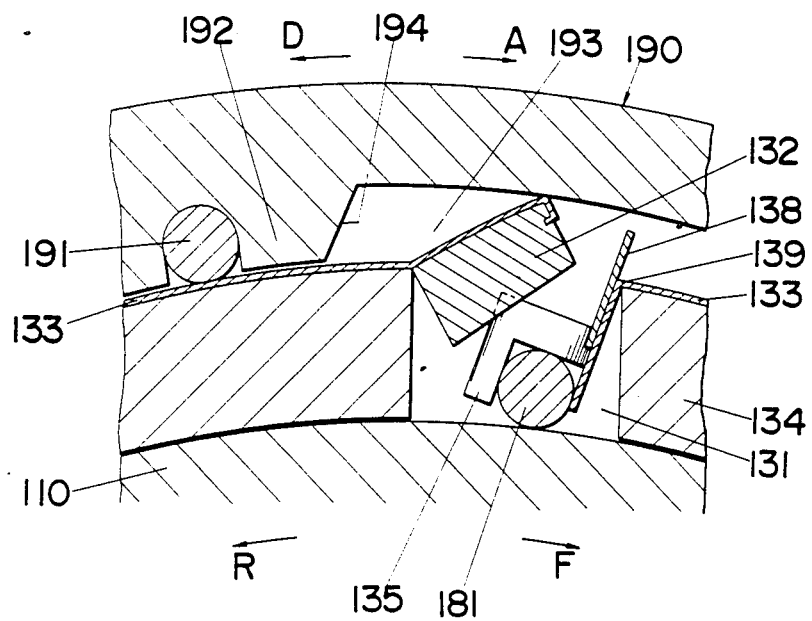
FIG. 10 is an enlarged sectional view of a portion of FIG. 8 illustrating the wedge element in its inactive position.

Located between the handle ring 130 and a grip ring 140 is a control handle 190 which is disposed around the clutch sleeve 134 with a cylinder bearing 191 in rolling contact with the leaf spring 133 so that it is relatively rotatable on the clutch sleeve 134. Formed along the inner surface of the control handle 190 are a raised portion 192 and a recessed portion 193 which defines at the juncture thereof an inclined shoulder 194. Upon manipulation of rotating the control handle 190 in one direction as indicated by an arrow A of FIG. 8, the raised portion 192 pushes the wedge element 132 radially inwardly against the bias of the leaf spring 133 into the closed position of FIG. 9. At this occurrence the shoulder 194 abuts against an outward extension 138 of the leaf spring 133 so as to pivot at 139 the end portion of the leaf spring 133 carrying the retainer 135 for guiding the roller 181 into the wedged groove 136, thus enabling or activating the above clutch connection. When the control handle 190 is rotated in the opposite direction D to move the raised portion 192 away from the wedge element 132, as shown in FIG. 10, the wedge element 132 is spring-biased into the recessed portion 193 to collapse the wedged groove 136, disabling or deactivating the clutch connection. In this embodiment utilizing the one-way clutch connection between the chuck body 110 and the handle ring 130, the handle ring 130 is allowed to rotate in the direction of tightening the gripping jaws 120 in relation to the chuck body 110 even when the control handle 190 holds the wedge element 132 in the closed or active position of FIG. 9 since the roller 181 acts to disengage the clutch sleeve 134 and the handle ring 130 from the chuck body 110 in response to such particular rotational direction of the handle ring 130 for the same reason as explained in the first embodiment. The control handle 190 is only required to be manipulated into the position of FIG. 10 when it is desired to loosen the gripping jaws 120.

Figure 11:
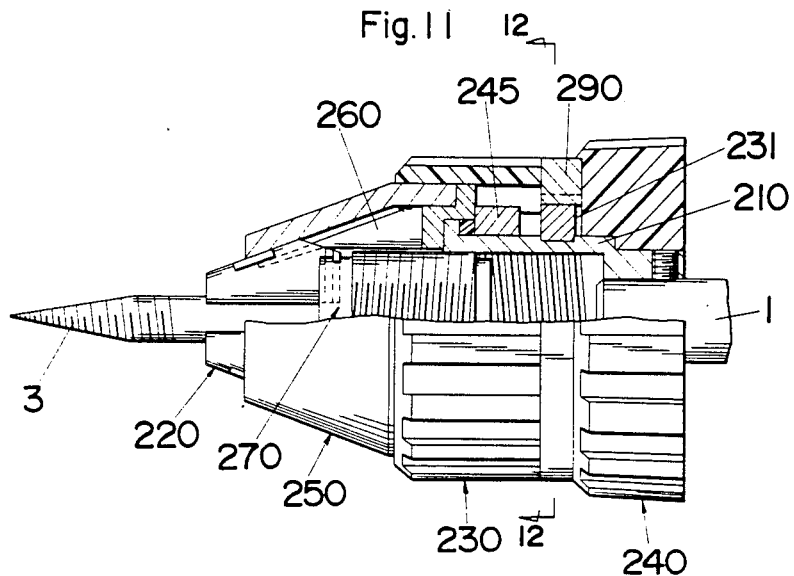
FIG. 11 is a side view, partly in section, of a chuck for a rotary tool with its control handle shown in a position of activating a clutch sleeve in accordance with a third embodiment of the present invention.
Figure 13:
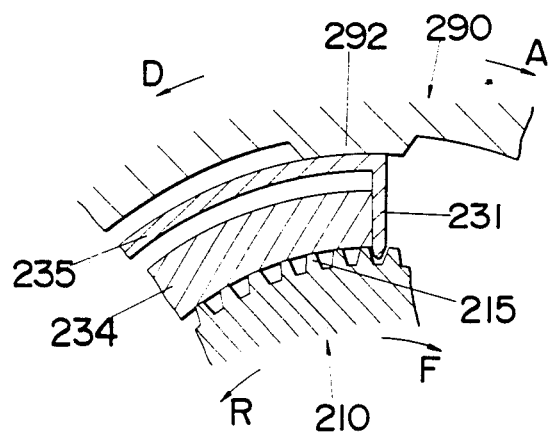
FIG. 13 is an enlarged sectional view of a portion of FIG. 12 illustrating a ratchet pawl in an active position.
Figure 12:
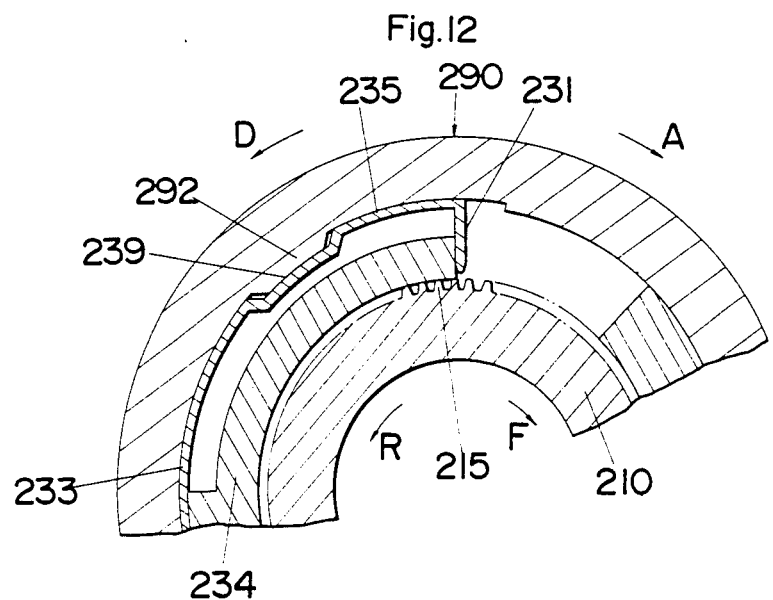
FIG. 12 is a fragmentary sectional view taken along line 12—12 of FIG. 11.but showing the control handle in an inactive position.

Third embodiment [FIGS. 11 to 13]

Referring to FIGS. 11 to 13, a chuck in accordance with a third embodiment of the present invention is shown which discloses another type of clutch connection between a clutch sleeve 234 and a chuck body 210. The other construction and operation are identical to those of second embodiment. The clutch sleeve 234 is disposed on a chuck body 210 to be rotatable in relation thereto and is interconnected to a handle ring 230 so as to be rotatable therewith as one rotating unit. The interconnection between the clutch sleeve 234 and the handle ring 230 may be made by suitably engaging the clutch sleeve 234 with any one of the handle ring 230, nose piece 250, jaw carrier 260, and a spacer ring 245 which constitute the above rotating unit. The chuck body 210 is drivingly connected to a tool bit 3 through a floating collet 270 and a gripping jaws 220 as in the same manner in the first embodiment. The clutch sleeve 234 is in the form of a split ring with a ratchet pawl 231 at the split end. The ratchet pawl 231 is provided at the free end of a leaf spring 233 which extends around the clutch sleeve 234 and is secured thereto at a portion rearwardly of an extension segment 235 including the ratchet pawl 231. The extension segment 235 is spaced radially outwardly from the split end of the clutch sleeve 234 to retain its resiliency at this portion for biasing the ratchet pawl 231 radially outwardly. The ratchet pawl 231 is actuated by a control handle 290 to move radially between an active position of FIG. 13 where it is engageable with teeth 215 formed on the exterior of the chuck body 210 and an inactive position of FIG. 12 where it is kept disengaged therefrom. The control handle 290 is disposed around the clutch sleeve 234 between the handle ring 230 and a grip ring 240 for relative rotation on the clutch sleeve 234. Upon rotation of the control handle 290 relative to the clutch sleeve 234 in one direction as indicated by an arrow A of FIG. 12, a raised portion 292 on the interior of the control handle 290 moves out of a concave 239 in the extension 235 of the leaf spring 233 to ride on the remaining portion of the extension 235, pushing it radially inwardly against the bias thereof for bringing the ratchet pawl 231 into engagement with one of the teeth 215 on the chuck body 210. The ratchet pawl 231 has its one side supported on the end of the clutch sleeve 234 so that it can be kept engaged with the teeth 215 so long as the chuck body 210 is driven to rotate in the reverse direction R and that it slips out of the teeth 215 when the chuck body 210 rotates in the forward direction F due to its spring resiliency. In this sense, the above ratchet pawl 231 provides like one-way clutch connection between the chuck body 210 and the handle ring 230, as in the previous embodiments. When it is desired to deactivate the clutch connection for allowing the handle ring 230 to be manipulated in the direction of loosening the gripping jaws 220, the control handle 290 is rotated in the opposite direction D so as to move the raised portion 292 back into the concave 239 of the spring 233, whereby the ratchet pawl 231 is returned by the bias of spring 233 to the inactive position of FIG. 12 where the clutch sleeve 234 and the handle ring 23 interconnected thereto are rendered to be freely rotatable with respect to the chuck body 230.

Figure 14:
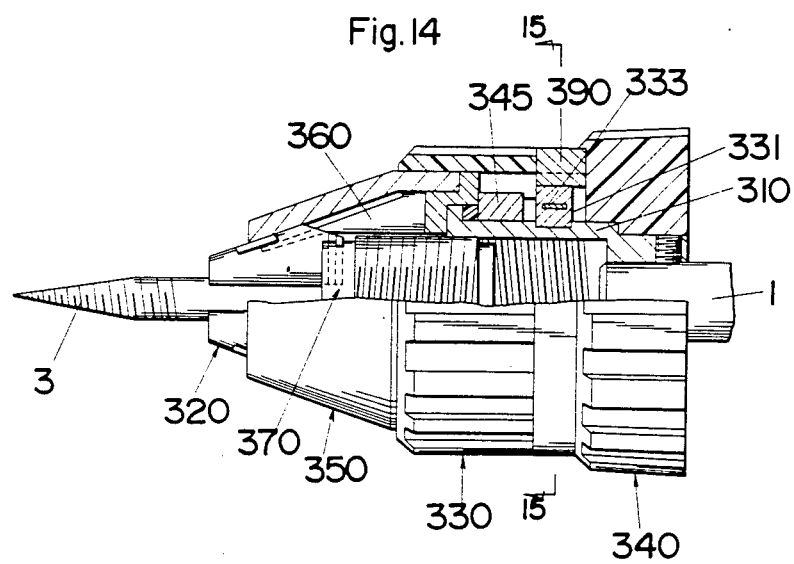
FIG. 14 is a side view, partly in section, of a chuck for a rotary tool with its control handle shown in a position of activating a clutch sleeve in accordance with a fourth embodiment of the present invention.
Figure 15:
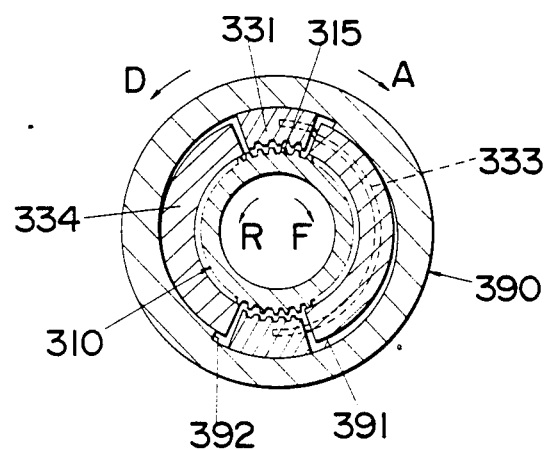
FIG. 15 is a sectional view taken along line 15—15 of FIG. 14 but showing the control handle in an inactive position.
Figure 16:
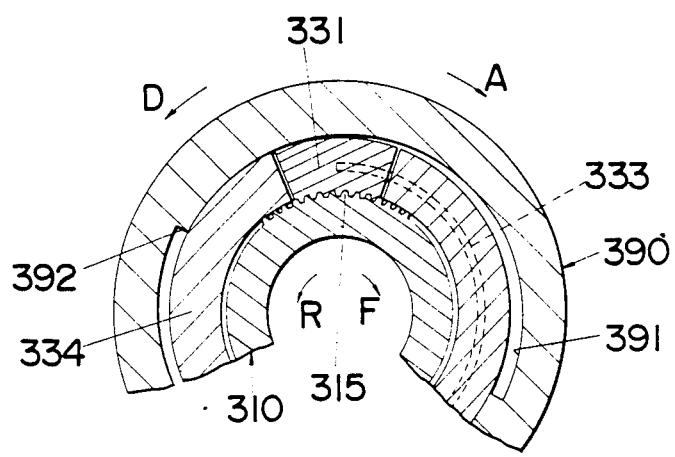
FIG. 16 is an enlarged sectional view of a portion of FIG. 15 illustrating the clutch sleeve in an active position.

Fourth embodiment [FIGS. 14 to 16]

A chuck in accordance with a fourth embodiment of the present invention is shown to have the identical construction and operation to the third embodiment except for a clutch mechanism for interconnecting a handle ring 330 and a chuck body 310. The chuck body 310 is drivingly connected to a tool bit 3 through a floating collet 370 and gripping jaws 320 in the same manner as in the previous embodiments. The clutch sleeve 334 is disposed on the chuck body 310 to be rotatable in relation thereto and is interconnected to the handle ring 330 so as to be rotatable therewith as one rotating unit. The interconnection between the clutch sleeve 334 and the handle ring 330 may be made by suitably engaging the clutch sleeve 334 with one of the members consisting of the above one rotating unit, which includes the handle ring 330, nose piece 350, jaw carrier 360, and a spacer ring 345. The clutch sleeve 334 is formed with a pair of toothed shoes 331 which are in diametrically opposed relation and are supported to the clutch sleeve 334 by means of a spring 333 embeded in the clutch sleeve 334 in such a manner as to be biased radially outwardly. A control handle 390 is disposed around the clutch sleeve 334 between a grip ring 340 and the handle ring 330 to be relatively rotatable with respect to the clutch sleeve 334. Formed on the inner surface of the control handle 390 is a cam surface 391 having increasing radii of successive points around its periphery and an abrupt transition 392 from a maximum radius to a minimum radius. Upon rotation of the control handle 390 in one direction A as indicated in FIG. 16, the cam surface 391 acts to move the toothed shoes 331 between an active position of FIG. 16 where the toothed shoes 331 are in meshing engagement with teeth 315 formed on the exterior of the chuck body 310 and an inactive position of FIG. 15 where it is out of meshing engagement therewith. When the toothed shoes 331 are engaged with the teeth 315, the clutch sleeve 334 and the handle ring 330 interlocked thereto are rotatively fixed to the chuck body 310 so that the handle ring 330 is caused to rotate together with the chuck body 310 in either direction. That is, in the present embodiment, a bidirectional clutch connection is provided between the handle ring 330 and the chuck body 310. In use, when the chuck body 310 is driven to rotate in the reverse direction R of removing the tool bit 3 from a workpiece, the control handle 390 is rotated to move the toothed shoes 331 in the active position for causing the handle ring 330 to rotate together with the chuck body 310 in the direction of tightening the gripping jaws 320. By the nature of the bidirectional clutch connection, when it is desired to manipulate the handle ring 330 for hand tightening the gripping jaws 320 on the tool bit 3, the control handle 390 is to be rotated in the direction D of disengaging the clutch sleeve 334 and therefore the handle ring 330 from the chuck body 310.

What is claimed is:

1. A chuck for a rotary tool comprising:
a chuck body having a longitudinal axis and adapted to be connected to a drive spindle of a drive source for being driven to rotate about the axis;
a set of gripping jaws drivingly connected to said chuck body and releasably holding a tool bit to be driven to rotate by said chuck body;
a handle ring rotatably disposed on the chuck body and operatively connected to said gripping jaws; said handle ring being relatively rotatable with respect to the chuck body for displacing the gripping jaws into tool-gripping relation with the tool bit when it is rotated relative to the chuck body in one direction and displacing the gripping jaws out of tool-gripping relation with the tool bit when rotated in the opposite direction relative to the chuck body, the rotating direction of the handle ring for displacing the gripping jaws into tool-gripping relation with the tool bit being corresponding to the reverse rotating direction of the chuck body for removing the tool bit from a workpiece;
clutch means for rotatively fixing the handle ring to the chuck body when the chuck body is driven to rotate in the reverse direction of removing the tool bit from the workpiece such that the handle ring is forced to rotate together with the chuck body in the direction of displacing the gripping jaws into tool-gripping relation with the tool bit;
control means acting on said clutch means to functionally move the same between an active position where said clutch means is capable of rotatively fixing the handle ring to the chuck body and an inactive position where said clutch means is deactivated to release the handle ring from the chuck body for permitting the handle ring to be freely rotatable in relation to the chuck body.

2. A chuck for a rotary tool as set forth in claim 1, wherein said clutch means comprises wedge means and roller means which combination constituting a one-way clutch between the handle ring and the chuck body, said one-way clutch acting to rotatively fix the handle ring to the chuck body for prevention of the relative rotation therebetween only when the chuck body is driven to rotate in the reverse direction of removing the tool bit from the workpiece.

3. A chuck for a rotary tool as set forth in claim 2, wherein said clutch means is biased to the active position.

4. A chuck for a rotary tool comprising:
a chuck body having a longitudinal axis and adapted to be connected to a drive spindle of a drive source for being driven to rotate about the axis;
a set of gripping jaws drivingly connected to said chuck body and releasably holding a tool bit to be driven to rotate by said chuck body;
a handle ring rotatably disposed on the chuck body and operatively connected to said gripping jaws; said handle ring being relatively rotatable with respect to the chuck body for displacing the gripping jaws into tool-gripping relation with the tool bit when it is rotated relative to the chuck body in one direction and displacing the gripping jaws out of tool-gripping relation with the tool bit when rotated in the opposite direction relative to the chuck body, the rotating direction of the handle ring for displacing the gripping jaws into tool-gripping relation with the tool bit being corresponding to the reverse rotating direction of the chuck body for removing the tool bit from a workpiece;
said handle ring being formed in its interior surface with a plurality of circumferentially spaced grooves about the longitudinal axis of the chuck body each for receiving therein a roller which is in rolling contact with the exterior of the chuck body;
each of said grooves defining on its bottom a wedge surface sloped radially inwardly in the circumferential direction about the longitudinal axis of the chuck body, said wedge surface forming within the groove a first portion of reduced depth adjacent to one of the circumferential ends of the groove and a second portion of increased depth portion adjacent to the other circumferential end thereof;
said roller in each of the grooves being movable between the first and second positions so as to constitute with said wedge surface a one-way clutch between the handle ring and the chuck body, said one-way clutch responding to the rotation of the chuck body in the reverse direction of removing the tool bit from the workpiece for rotatively fixing the handle ring to the chuck body as the roller is dragged by the rotating chuck body into engagement with the wedge surface of the first portion;
each of said grooves extending axially to define on its bottom an axially extending tapered surface which is inclined with respect to the longitudinal axis of the chuck body and is engageable along substantially the entire length thereof with said roller, said roller having its axis of rotation in parallel relation with the tapered surface; and
said handle ring being axially movable so that the tapered surface of each groove defines with the corresponding roller control means which responds to the axial movement of the handle ring in one direction for bringing the tapered surface into engageable relation with the corresponding roller so as to activate said one-way clutch, and which responds to the axial movement of the handle ring in the opposite direction for bringing the tapered surface out of engageable relation with the corresponding roller to deactivate the one-way clutch and permit the handle ring to be freely rotatable with respect to the chuck body.

5. A chuck for a rotary tool as set forth in claim 4, wherein said handle ring is biased into the position of activating the clutch.

6. A chuck for a rotary tool as set forth in claim 4, wherein the handle ring comprises an exterior portion adapted to be manipulated for rotation thereof and an interior portion forming therein said grooves, said exterior portion being made of plastic material, and the interior portion being made of metallic material having good wear resistance.

7. A chuck for a rotary tool as set forth in claim 1, wherein said clutch means comprises:
 a clutch sleeve rotatably disposed around the chuck body and interconnected to the handle ring to be rotatable therewith as one rotating unit, said clutch sleeve being formed along its circumference with a wedge element which is opposed to the exterior of the chuck body to define therebetween a groove with a wedge surface on the side of the wedge element, said wedge surface being sloped radially inwardly in the circumferential direction about the longitudinal axis of the chuck body, said wedge surface forming within the groove a first portion of reduced depth adjacent to one of the circumferential ends of the groove and a second portion of increased depth portion adjacent to the other circumferential end thereof;
 a roller trapped in the groove and being movable between the first and second portions so as to constitute with said wedge surface a one-way clutch between the clutch sleeve and the chuck body, said one-way clutch responding to the rotation of the chuck body in the reverse direction of removing the tool bit from the workpiece for rotatively fixing the clutch sleeve to the chuck body as the roller is dragged into engagement with the wedge surface of the first portion by the chuck body rotating in that direction;
 said wedge element being radially movable between the active position in which it is closed to the exterior surface of the chuck body to form therebetween said wedged groove and the inactive position in which it is away from the exterior surface of the chuck body to collapse the wedged groove;
 and wherein said control means comprises:
 a control handle disposed around the clutch sleeve to be relatively rotatable thereto for controlling said wedge element to move between the active position and the inactive position upon being selectively rotated about the clutch sleeve.

8. A chuck for a rotary tool as set forth in claim 1, wherein said clutch means comprises:
 a clutch sleeve rotatably disposed around the chuck body and interconnected to said handle ring to be rotatable therewith as one rotating unit, said clutch sleeve including at least one ratchet pawl which is engageable with teeth formed on the exterior of the chuck body so as to provide a one-way clutch between the clutch sleeve and the chuck body, said one-way clutch responding to the rotation of the chuck body in the reverse direction of removing the tool bit from the workpiece for rotatively fixing the clutch sleeve to the chuck body by the engagement of the ratchet pawl with said teeth;
 and wherein said control means comprises:
 a control handle disposed around the clutch sleeve to be relatively rotatable thereto for controlling said ratchet pawl to move between the active position where it engages the teeth for one-way clutch connection and the inactive position where it is disengaged from the teeth for permitting the clutch sleeve and the handle ring to be freely rotatable with respect to the chuck body.

9. A chuck for a rotary tool as set forth in claim 1, wherein said control means comprises:
 a clutch sleeve rotatably disposed around the chuck body and interconnected to said handle ring to be rotatable therewith as one rotating unit, said clutch sleeve including a pair of diametrically opposed toothed shoes which are radially movable between the active position in which it is in meshing engagement with the chuck body so as to rotatively fix the clutch sleeve to the chuck body for preventing relative rotation therebetween and the inactive position in which it is out of meshing engagement with the teeth for permitting the clutch sleeve and the handle ring to be freely rotatable with respect to the clutch body;
 and wherein said control means comprises:
 a control handle disposed around the clutch sleeve to be relatively rotatable thereto for controlling said toothed shoes to move between the active and inactive positions.

* * * * *